(No Model.)
A. KOELLER & A. MUELLER.
HUB ATTACHING DEVICE.
No. 371,077. Patented Oct. 4, 1887.
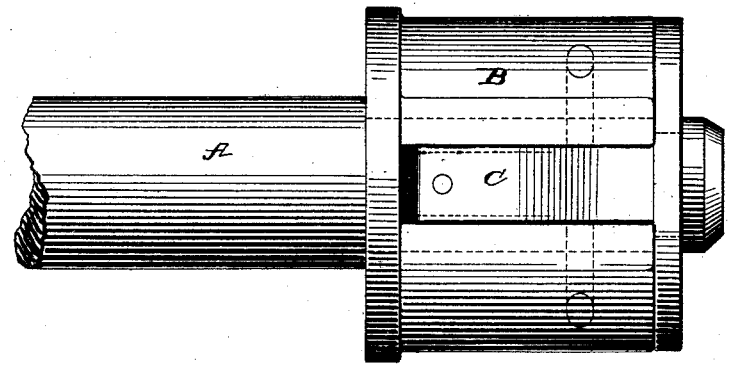
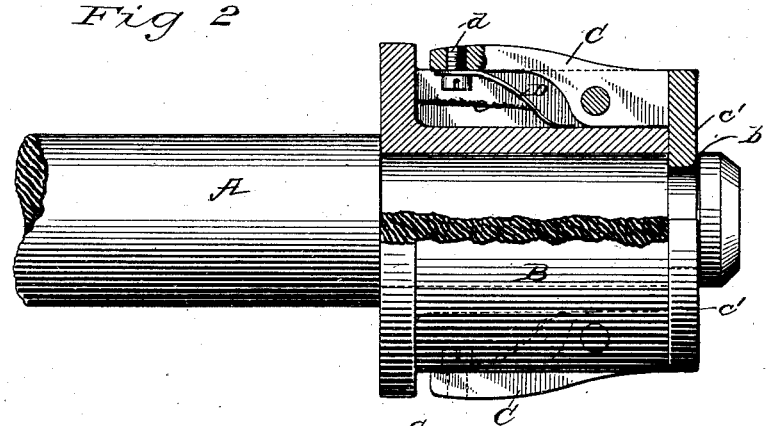
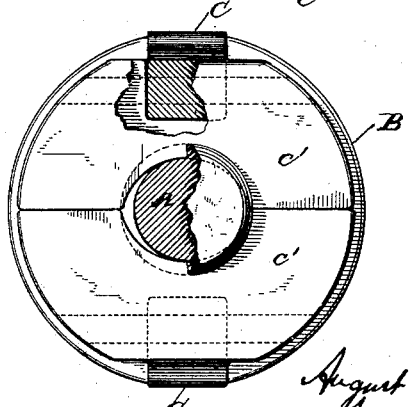
Witnesses
Geo. W. Young.
Maurice F. Frear.
Inventors
August Koeller
August Mueller
By Strul & Underwood
Attorneys

UNITED STATES PATENT OFFICE.

AUGUST KOELLER AND AUGUST MUELLER, OF MILWAUKEE, WISCONSIN.

HUB-ATTACHING DEVICE.

SPECIFICATION forming part of Letters Patent No. 371,077, dated October 4, 1887.

Application filed May 23, 1887. Serial No. 239,050. (No model.)

*To all whom it may concern:*

Be it known that we, AUGUST KOELLER and AUGUST MUELLER, of Milwaukee, in the county of Milwaukee, and in the State of Wisconsin, have invented certain new and useful Improvements in Washers for Vehicle-Axles; and we do hereby declare that the following is a full, clear, and exact description thereof.

Our invention relates to washers for vehicle-axles, and will be fully described hereinafter.

In the drawings, Figure 1 is a top view of our device in place on an axle. Fig. 2 is a side view partly in section, and Fig. 3 is a front end view partly in section.

A is the axle, and B the body of the washer, which latter is recessed at top and bottom, as at $c$, to receive levers C. Each lever C has a catch, $c'$, on one end, and to the under side of the other end of each lever is secured one end of a spring, D, by a screw, $d$, and this spring D projects downward and forward, its free end resting on the washer B in the recess $c$, so that it will lift upon the rear end of its lever C. The axle A is made with a reduced portion that corresponds in width to the length of the washer and the thickness of the catches $c'$ combined, and is also grooved at $b$ to receive the catches $c'$ $c'$, and the edges of the catches are recessed, so that when closed they will encircle the axle and not only hold the washer on the axle, but will keep out sand and dust.

When the washer is to be removed, the rear ends of the levers C are pressed toward each other, lifting the catches $c'$ out of the groove $a$, when the washer may be drawn off the axle to permit the removal of the wheel.

Our improved washer takes the place of the nut commonly used to lock the wheels on the axle of vehicles.

Having thus fully described our invention, what we claim as new, and desire to secure by Letters Patent, is—

The combination, with the body of the washer, of the spring-levers and their catches, the latter recessed so as to encircle the axle as they enter the grooves $b$, and thus close the end of the washer, substantially as described.

In testimony that we claim the foregoing we have hereunto set our hands, at Milwaukee, in the county of Milwaukee and State of Wisconsin, in the presence of two witnesses.

AUG. KOELLER.
    AUGUST MUELLER.

Witnesses:
    S. S. STOUT,
    MAURICE F. FREAR.